United States Patent
Manz

(10) Patent No.: US 7,298,324 B2
(45) Date of Patent: Nov. 20, 2007

(54) APPARATUS FOR AND METHOD OF IMPROVING POSITION AND TIME ESTIMATION OF RADIO LOCATION DEVICES USING CALIBRATED PULSE SHAPES

(75) Inventor: Allan Manz, Airdrie (CA)

(73) Assignee: NovAtel, Inc., Calgary, Alberta (CA)

( * ) Notice: Subject to any disclaimer, the term of this patent is extended or adjusted under 35 U.S.C. 154(b) by 107 days.

(21) Appl. No.: 11/145,442

(22) Filed: Jun. 3, 2005

(65) Prior Publication Data

US 2006/0273955 A1 Dec. 7, 2006

(51) Int. Cl.
*G01S 5/14* (2006.01)

(52) U.S. Cl. .............................. 342/357.15; 342/357.02

(58) Field of Classification Search ........... 342/357.02, 342/357.06, 357.15, 357.12
See application file for complete search history.

(56) References Cited

U.S. PATENT DOCUMENTS

| | | | |
|---|---|---|---|
| 5,414,729 A | 5/1995 | Fenton | |
| 5,615,232 A | 3/1997 | Van Nee | |
| 5,692,008 A | 11/1997 | Van Nee | |
| 5,831,576 A | 11/1998 | Sheynblat | |
| 6,463,091 B1* | 10/2002 | Zhodzicshsky et al. | ..... 375/149 |
| 6,882,314 B2 | 4/2005 | Zimmerman et al. | |
| 2002/0050944 A1* | 5/2002 | Sheynblat et al. | ..... 342/357.06 |
| 2004/0078142 A1* | 4/2004 | Fuchs et al. | ................ 701/213 |

FOREIGN PATENT DOCUMENTS

EP   0892277 A2   1/1999

* cited by examiner

*Primary Examiner*—Thomas H. Tarcza
*Assistant Examiner*—Fred H. Mull
(74) *Attorney, Agent, or Firm*—Cesari and McKenna, LLP

(57) ABSTRACT

GPS receivers utilize reference pulse shapes in operations to determine estimates of position and time to correct for range biases in differential operations and in signal quality operations. The reference pulse shapes may be code family based, or may be calibrated on a per satellite basis, to incorporate therein the affects of the satellite hardware on the transmitted signals. The receivers may further manipulate the calibrated pulse shape models on a per receiver basis, to incorporate therein the affects of the IF and RF paths through the respective receivers. The calibrated reference pulse shapes may also be used in multipath mitigation processing operations for the respective codes, to produce estimates of the direct path signals and corrections for the carrier and code tracking loops.

23 Claims, 6 Drawing Sheets

APPARATUS FOR AND METHOD OF IMPROVING POSITION AND TIME ESTIMATION OF RADIO LOCATION DEVICES USING CALIBRATED PULSE SHAPES

BACKGROUND OF THE INVENTION

1. Field of the Invention

The invention relates generally to spread-spectrum systems and, in particular, to systems that utilize reference pulse shapes of the correlation functions to improve the determination of the position and time estimation of radio location devices, such as GPS receivers.

2. Background Information

One example of a system that utilizes broadcast spread-spectrum signals is a global positioning system, such as, GPS, GLONAS or GALILEO systems. The system receivers determine their global positions based on the signals they receive from associated satellites. The broadcast spread-spectrum signal consists of a carrier that is modulated by at least one pseudorandom code, such as a binary PRN code that is a pseudo random sequence of one and zeros that periodically repeat. The ones and zeros in the PRN code are referred to as "code chips," and the transitions in the code from one to zero or zero to one, which occur at "code chip times," are referred to as "chip transitions." Each satellite uses a unique set of PRN codes on the signals it transmits, and thus, a receiver can associate a received signal with a particular satellite by determining which PRN code is included in the signal.

The receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position and estimates the receiver time.

To determine the relative difference between the time a signal is transmitted and the time the signal is received, the receiver correlates a locally-generated version of the signal with the received signal. In particular, the receiver correlates a locally-generated carrier and a locally-generated PRN code with the carrier and the PRN code transmitted by the satellite. The timing of the locally-generated signal relative to the received signal is continually adjusted using information from correlation processes, to bring the locally generated signal into alignment with the received signal. Periodically, the receiver (a) samples the state, or the phase, of the locally generated signal in terms of fractions of chips, whole chips and code epochs of the PRN code, and carrier signal phase, and (b) converts the sampled state into a signal transmission time.

The receiver computes the signal travel times using a current estimate of the receiver time and the signal transmission times associated with at least four satellites and converts the signal travel times to distances. The receiver then combines the distances with respective computed satellite positions, estimates of associated ionospheric and tropospheric delays, and initial estimates of receiver position and time to produce refined estimates of receiver position and time.

The accuracy in synchronizing the state of the receiver-generated signals with the received signals directly affects the accuracy with which the receiver estimates its global position and time. The PRN code synchronization operations include the acquisition of the satellite PRN code and the tracking of the code. To acquire the PRN code, the receiver generally makes a series of correlation measurements that are separated in time by one or one-half code chip, to determine when the locally generated code aligns with the received code to within one code chip. To track the PRN code, the receiver generally makes correlation measurements that are associated with the received PRN code and early and late versions of the locally generated PRN code. Using the early and late correlation measurements, the receiver produces an associated error signal that is proportional to the misalignment between the local PRN code and the received PRN code. The error signal is used, in turn, to control the PRN code generator, which shifts the phase of the local PRN code essentially to minimize the error signal.

The receiver typically aligns the satellite carrier with a local carrier using correlation measurements associated with a punctual version of the local PRN code. To do this the receiver uses a carrier tracking phase lock loop.

The performance of the receiver in determining its position and time can be improved if the receiver is provided with additional information relating to estimated computation errors and also estimates of atmospheric, i.e., the ionospheric and tropospheric, delays. The sources of the errors in the calculations include satellite state errors, such as, for example, the differences between the computed and actual time bases for the satellites and the computed and actual positions of the satellites. Another source of errors is the corruption of the received signal by multipath signals, which are signals that travel along different paths and are reflected to the receiver from the ground, bodies of water, nearby buildings, etc.

One or more receivers at known locations monitor the satellite signals and produce corrections for the atmospheric delay information and the satellite state information. These one or more receivers may provide the corrections to remote receivers, which then incorporate the corrections into their real time position and time calculations. Alternatively, the corrections may be stored along with the correlation measurements made by the respective remote receivers, such that off-line adjustments can be made to the position and time calculations.

The multipath signals, which arrive at the receiver after the direct-path signal, combine with the direct-path signal to produce a distorted received signal. The distortion adversely affects code synchronization operations because the correlation measurements, which measure the correlation between the local PRN code and the received signal, are based on the entire received signal—including the multipath components thereof. Accordingly, the distortion may induce errors in the receiver synchronization process with the direct-path signal.

One way to more accurately synchronize the received and the locally-generated PRN codes is to use narrow correlation techniques as described in U.S. Pat. Nos. 5,101,416; 5,390, 207 and 5,495,499. Another way is to use a multipath mitigation technique ("MMT") that iteratively produces estimates of the correlation function pulse shapes associated with the direct path signal and one or more of the multipath signals.

One such technique is described in U.S. Pat. Nos. 5,615, 232 and 5,692,008, and a related technique that uses multiple correlators is described in U.S. Pat. No. 5,414,729. The MMT's may be used alone or in combination with the narrow correlation technique.

The GNSS receivers may use reference pulse shapes as part of the multipath mitigation processing operations, to aid in determining the direct path signal. The reference pulse shapes are associated with characteristic pulse shape models that are based on a set of correlation values associated with a given type of PRN code, i.e., a C/A code or a P code. As described in U.S. Pat. No. 5,615,232, the reference pulse shapes may be produced using correlation measurements that are made in the absence of significant signal noise and multipath signals, using a PRN code signal produced by a signal simulator. The reference pulse shapes, which are stored in, for example, a table in the receiver, are retrieved for use in the multipath mitigation calculations as described in the U.S. Pat. No. 5,615,232. In practice, the receiver manufacturers may operate a receiver in an environment that is free of multipath signals and determine the reference code pulse shapes using the GNSS satellite signals.

An improvement to the multipath mitigation technique uses reference pulse shapes for "code families" within the code types. A code family is defined by a set of correlation values that correspond to differences in alignment of ±1 chip and/or ±2 chips, with codes in the same family having the same set of correlation values. With the GPS C/A code, a one chip delay defines three C/A code families by the three possible correlation values or 1, 0 or −1. Using both one and two chip delays, there are nine possibilities, however, two combinations of the values do not occur with the C/A code and there are thus seven C/A codes families. Each of the 7 families has its own reference pulse shape.

While the multipath mitigation techniques work well, there is room for some improvement. In particular, there is room for improvement in situations in which the timing of the chip transitions in the multipath signals is very close to the timing of the chip transitions in the direct path signal. In such situations, the known prior systems may introduce residuals and associated tracking errors into the processing based on the differences between the reference pulse shapes and the pulse shapes that correspond to the transmitted codes. Accordingly, what is needed is a mechanism to reduce the residuals and associated tracking errors.

The typical correlation process described above produces the distinctive triangularly shaped function. The functionality of this correlation process, namely, determining the relative alignment between received and locally generated signals, can also be accomplished using other techniques. The other techniques may, however, result in the function having a shape other than the traditional triangular shape. In particular, as discussed in a co-pending patent application entitled Apparatus For And Method of Making Pulse-Shape Measurements, filed Apr. 13, 2004 and accorded U.S. Ser. No. 10/823,030, which is incorporated herein in its entirety by reference, a system may employ a pre-correlation filtering process that produces a step shaped function.

The pre-correlation filtering process can measure distortions in the perceived signal with greater fidelity than a traditional correlation process, as is described in the co-pending patent application. The improved fidelity is a result of measuring a signal within several well-defined ranges with respect to an estimated chip transition location rather than using a measurement that is obtained through an integration process. I have determined that the use of reference pulse shape models, here reference step shape models, provides further improvement to the receiver that uses the pre-correlation filtering process, as discussed in more detail below.

Further, as is also discussed below, I have determined that certain benefits can be achieved by using reference pulse shapes in other receiver operations, that is, in operations other than multipath mitigation processing, such as in position estimation and timing estimation operations that are included in differential operating modes and in signal quality monitoring operations.

SUMMARY OF THE INVENTION

A receiver operating in accordance with the current invention uses reference pulse shapes in position estimation and timing estimation operations to incorporate into the operations the characteristics of the satellite signals as determined from the perspective of the receiver. In differential mode operations, a remote receiver adjusts the correction information provided by a reference receiver based on differences between the pulse shape models that are applicable to the operations of the respective receivers. In signal quality management operations, the receiver utilizes reference pulse shapes to determine if respective satellite signals have changed over time, from the perspective of the receiver.

In the differential mode operations, the remote receiver adjusts the position correction data provided by the reference receiver using "correlation value corrections," which correspond to the differences between the reference pulse shape models that are maintained by or are applicable to the two receivers. These differences translate to differences in the corresponding pseudoranges, that is, to range biases. Accordingly, the receiver uses the reference pulse shapes in the differential mode operations to remove the range biases, and thus, produce improved estimations for positions and time, as described in more detail below.

In signal quality management operations, the reference pulse shapes may be used essentially to establish the underlying correlation values to which correlation values measured in real time are compared. The receiver then uses the differences between the correlation values determined from the reference pulse shape and the measured correlation values, to determine if a given satellite is malfunctioning. Further, the reference pulse shapes may be used to determine range biases between receiver channels that use different correlation techniques. As described in more detail below, the receiver uses the reference pulse shapes in the signal quality management operations in order to more readily detect satellite malfunction, and also, to avoid calibration operations that are otherwise required each time the receiver powers up.

The receiver may use code family based reference pulse shapes in the differential and signal quality management operations. For further improvements to the differential mode operations, the signal quality management operations and/or multipath mitigation operations, the receivers may instead use reference pulse shapes that are calibrated on a per satellite basis, to incorporate therein the effects that the satellite transmission hardware has on the received signals as seen from the perspective of the receiver. The calibrated reference pulse shape models may be even further manipulated over time on a per receiver basis, to incorporate therein the affects of the IF and RF paths through the receiver, and thus, produce calibrated reference pulse shape models that are unique to the respective receivers.

The receiver uses the calibrated reference pulse shapes in multipath mitigation processing operations in place of the conventional reference pulse shapes, to aid in distinguishing between the direct path signal and one or more multipath signals in which the chip transition times are close to those of the direct path signal. The receivers use the calibrated reference pulse shapes in the differential operating mode, to provide more precise position and time estimates by eliminating more of the range bias from the differential position correction data provided by the reference receiver. Further, the receiver uses the calibrated reference pulses in signal quality management operations in order to more readily determine satellite malfunction.

The calibrated reference pulse shape models for a given receiver type are determined by modifying the applicable code family reference pulse shape models, based on correlation measurements taken using the respective satellite signals over a predetermined period, i.e., days, when the receiver is receiving satellite signals that are essentially free of multipath and excessive noise. The modifications to the code family based reference pulse shapes are on a per satellite code basis. The receiver may use a combination of calibrated reference pulse shape models and code-family based reference pulse shape models, as appropriate. The code family based models may, for example, be used with the codes transmitted by a particular satellite until the calibrated models can be determined from associated correlation measurements. Thus, the code family models can be used for newly launched satellites, repaired satellites, and so forth.

BRIEF DESCRIPTION OF THE DRAWINGS

The invention description below refers to the accompanying drawings, in which.

DETAILED DESCRIPTION OF AN ILLUSTRATIVE EMBODIMENT

Figure 1:
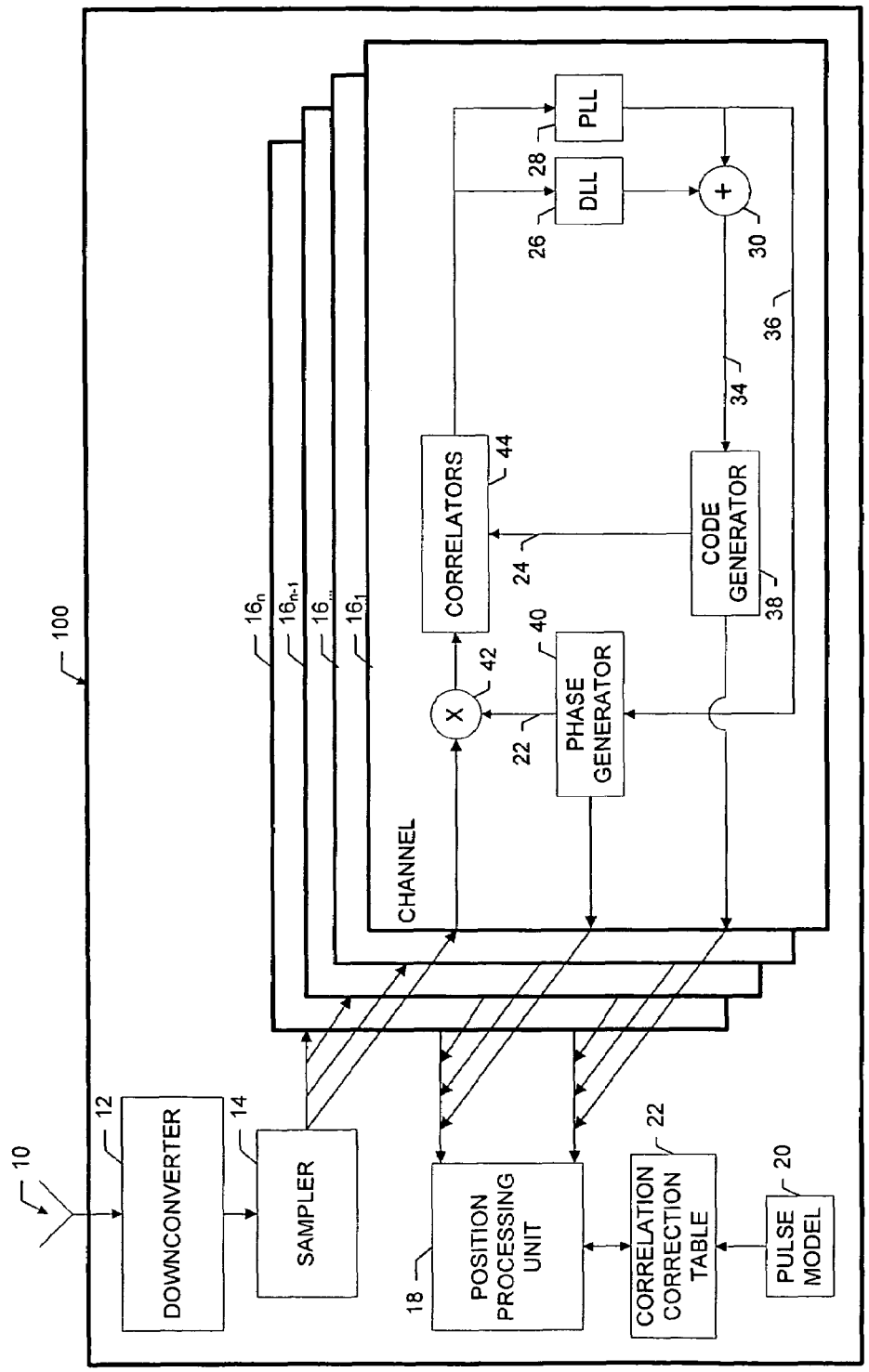
FIG. 1 is a functional block diagram of a receiver that operates in accordance with the invention.

As shown in FIG. 1 a receiver 100 that incorporates the invention includes an antenna 10 that receives spread spectrum signals that are transmitted by, for example, GPS satellites (not shown). A downconverter 12 translates the incoming satellite signals to an intermediate frequency. A sampler 14 samples the downconverted signal, and provides the samples to a plurality of data correlation channels $16_1 \ldots 16_n$. For convenience, only one channel $16_1$ is shown in expanded detail.

A given correlation channel 16 acquires and tracks the satellite signal in a well-known manner using correlators 44, a carrier phase tracking loop 36 and a code tracking loop 34. At predetermined times, the various channels provide ranging data to a position processing unit 18, which determines global position and time in a known manner. The position processing unit 18 also provides overall control of the correlation channels, such as assigning the signals from particular satellites to the channels and providing the channels with a central clock signal.

More specifically, the correlators 44 accumulate correlation measurements and supply them to a phase lock loop ("PLL") 28 and a delay lock loop ("DLL") 26. The PLL 28 and DLL 26 convert the correlation measurements into carrier phase and code phase rates, respectively, and provide the rates to a carrier phase generator 40 and a code generator 38. The carrier phase generator 40 and code generator 38 convert the respective carrier and code rates to estimated carrier and code phases.

The receiver 100 uses the estimated carrier phase to remove the carrier from the downconverted received signal samples, in accordance with well-defined transformations. In particular, the transforming operation 42 combines the signal samples with corresponding estimates of the carrier. The code generator 38 uses code rate information to control the phase of the local PRN code, to bring a locally-generated code into closer alignment with the received code. The locally-generated code is supplied to the correlators 44, which make the correlation measurements that essentially characterize the alignment between the received signal and the receiver-estimated signal. The correlation measurements are, in turn, used by the DLL 26 to generate the code rate signals that control the operations of the code generator. Typically, the DLL 26 is operated at a much lower rate than the PLL 28, and therefore, it is advantageous to aid the code-tracking loop 34 with the carrier-tracking loop 36 in a known manner through a summation operation that is performed by an adder 30.

Periodically, the state of the carrier phase generator 40 and code generator 38 are sampled by the position processing unit 18. The position processing unit 18 utilizes the state information, which represents the estimated carrier phase and the estimated code phase of the signal, to compute the corresponding pseudorange. The position processing unit similarly determines the pseudoranges associated with at least two additional satellites and ultimately determines the receiver's estimated position and time from the pseudoranges.

Figure 7:
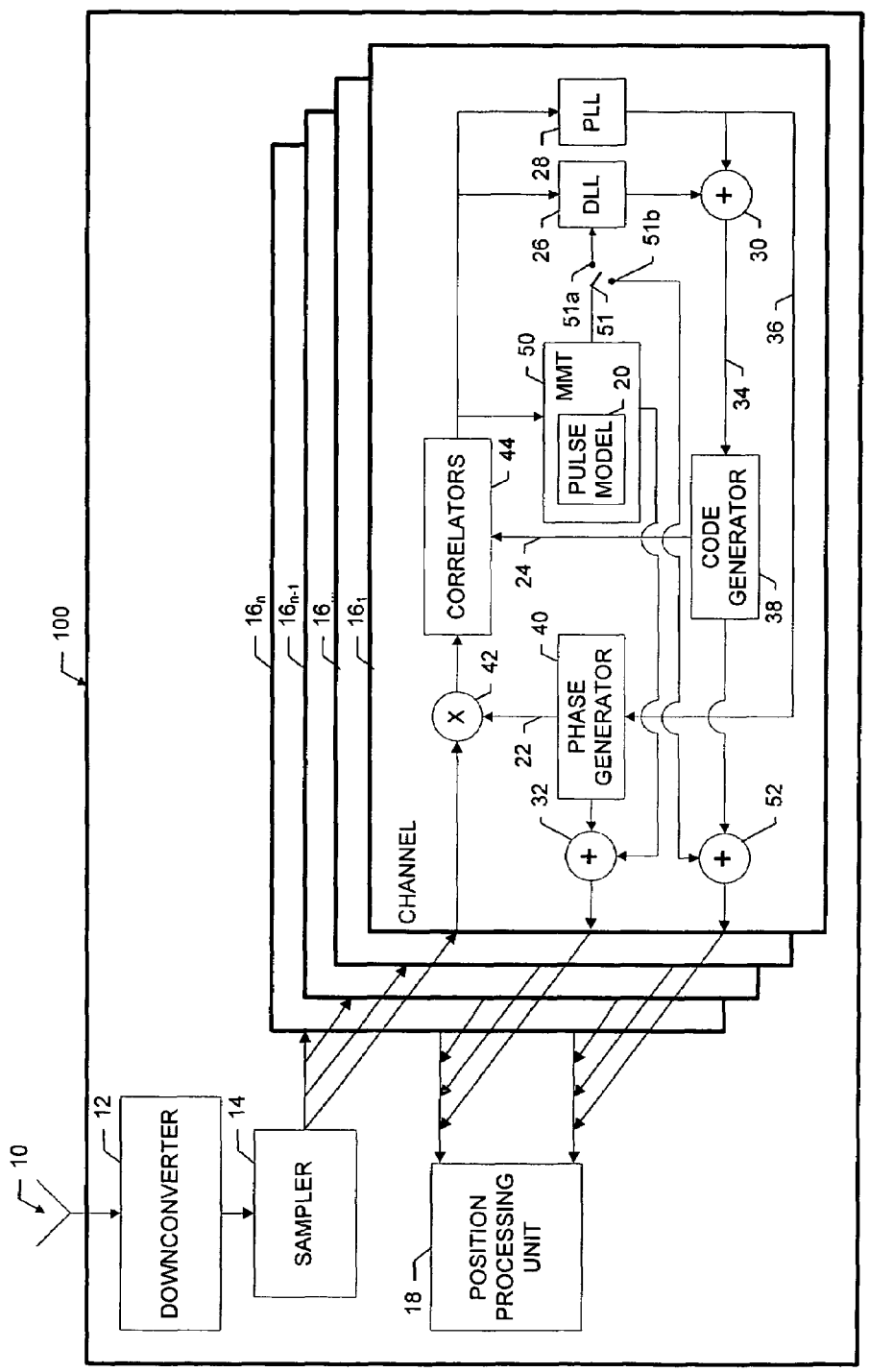
FIG. 7 is a functional block diagram of an alternative embodiment of a receiver that operates in accordance with the invention.

The receiver 100 further includes a reference pulse shape model table 20 that contains correlation values that correspond to reference pulse shape models that are applicable to the receiver. The reference pulse shape models may be models associated with the respective PRN codes, such as GPS C/A code or P code, or preferably to code families. As discussed below, the reference pulse shape models are used in differential mode operations and/or signal quality management operations. At the same time or in addition, the code family reference pulse shapes models may be used in a known manner in multipath mitigation operations that are performed by an MMT processor 50 (FIG. 7). As further discussed below, the code family models may be calibrated to the individual satellite codes, and the calibrated models are then stored in the pulse model table 20. These calibrated models may then be used in multipath mitigation operations, to more readily distinguish the direct path signal from one or more multipath signals. In addition, the calibrated models may be used in place of the reference pulse shape models in the differential mode and/or signal quality management operations of the receiver to improve these operations. Further still, the calibrated reference shapes may be calibrated on a per receiver basis, to take account of differences in hardware and so forth.

Figure 2:
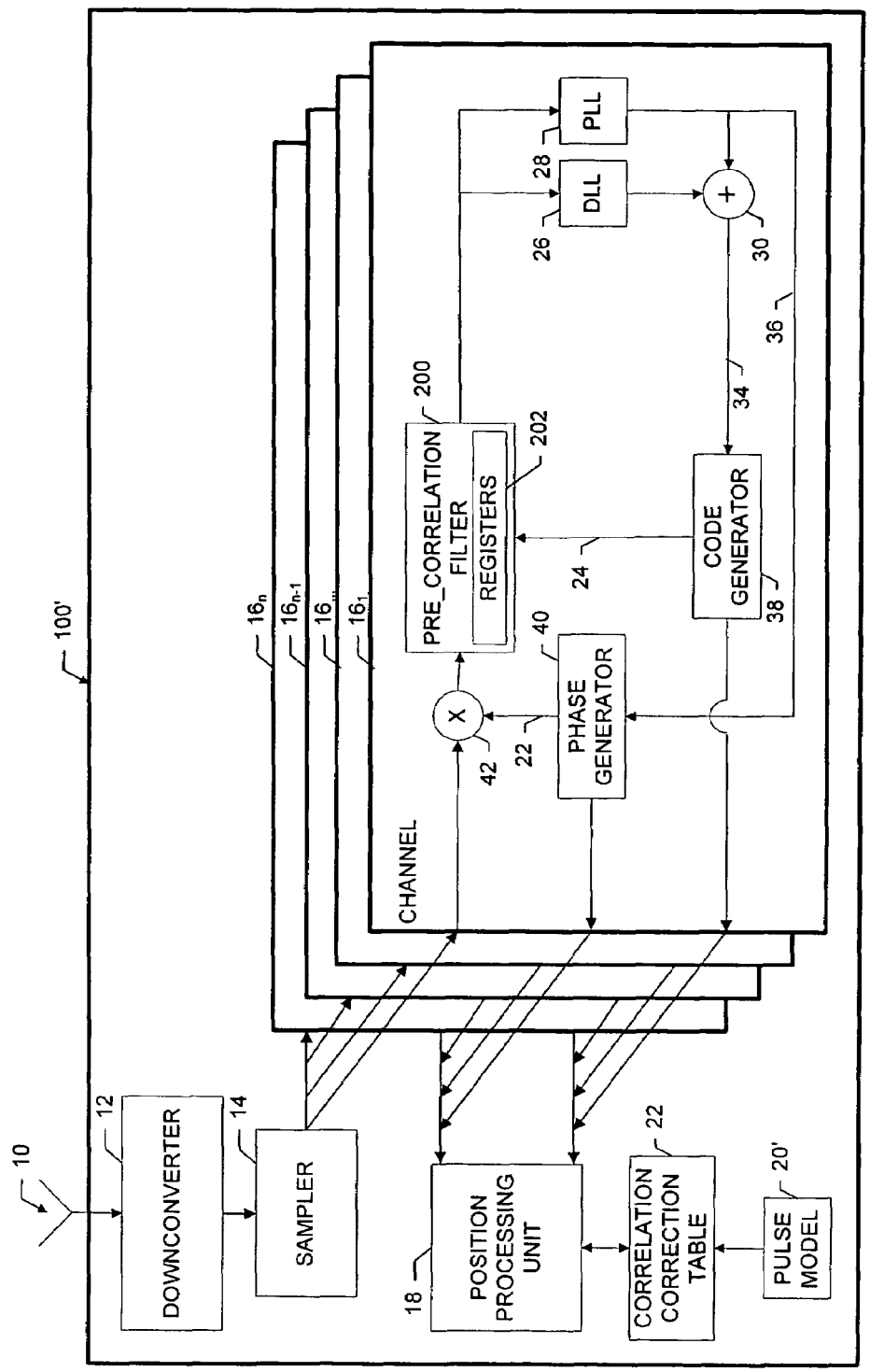
FIG. 2 is a functional block diagram of a receiver that includes a pre-correlation filter and operates in accordance with the invention.

Referring now to FIG. 2 the receiver 100' includes a pre-correlation filter 200, that accumulates measurements that correspond to the received signal in registers 202, which that correspond to code chip ranges that span all or a portion of a code chip. The receiver produces a step-shaped pulse that is used in the process of aligning the locally generated signal to the received signal. The receiver includes a reference pulse shape model table 20' that contains correlation values that correspond to step-shaped reference pulse shapes that are applicable to the receiver. The reference pulse shapes may be models that are associated with the respective PRN codes, and are preferably calibrated to the respective satellites, receivers or both such that the reference pulse shapes include the affects that the satellite and/or receiver RF circuitry has on the signals.

A. The Reference Pulse Shapes

Figure 3:
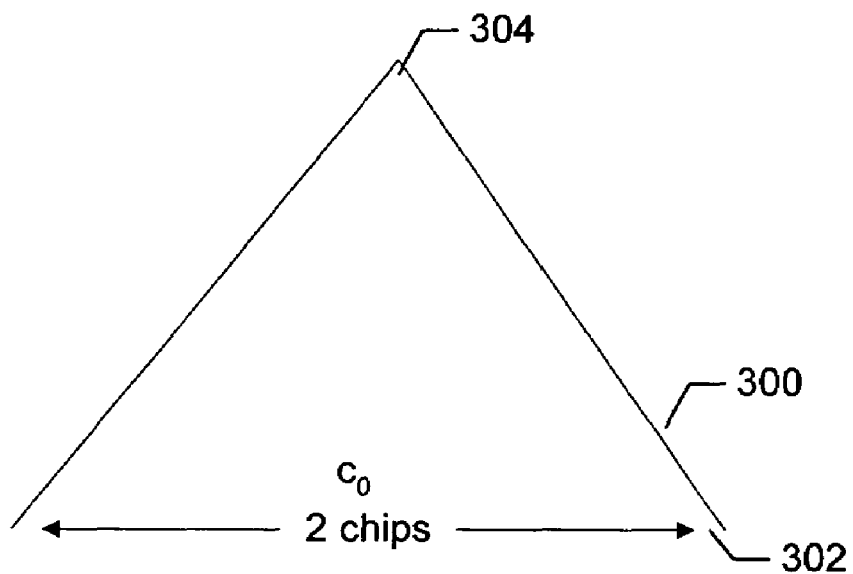
FIG. 3 is an illustration of an ideal triangular pulse shape.

Before discussing how the reference pulse shapes are determined and then used, I discuss the traditional triangular pulse shapes and the step pulse shapes, in general. Referring now to FIG. 3, an ideal correlation function 300 is illustrated for the GPS C/A code. The correlation function has a base 302 that is two code chips wide and a sharp peak 304. A code tracking point $C_0$, which corresponds to the location of the peak, is easily determined from early and late correlation measurements.

Figure 4:
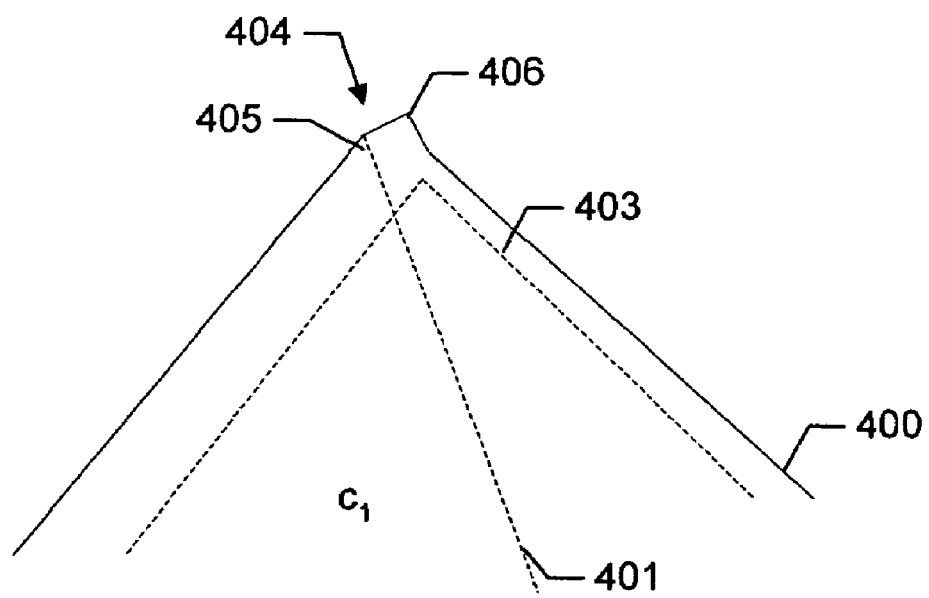
FIG. 4 is an illustration of a triangular pulse shape model that includes contributions from multipath signals.

FIG. 4 depicts a correlation function 400 that includes contributions from both a direct path and a multipath signal, which are indicated by dotted lines 401 and 403, respectively. A correlation function peak 404, which is less well defined than the peak 304 because of the effects of the multipath signals includes relative maximum points 405 and 406, which correspond to the contributions from each of the signals 401 and 403. A code tracking point $C_1$ is estimated from early and late correlation measurements to occur at or near one of the relative maximum points.

Figure 5:
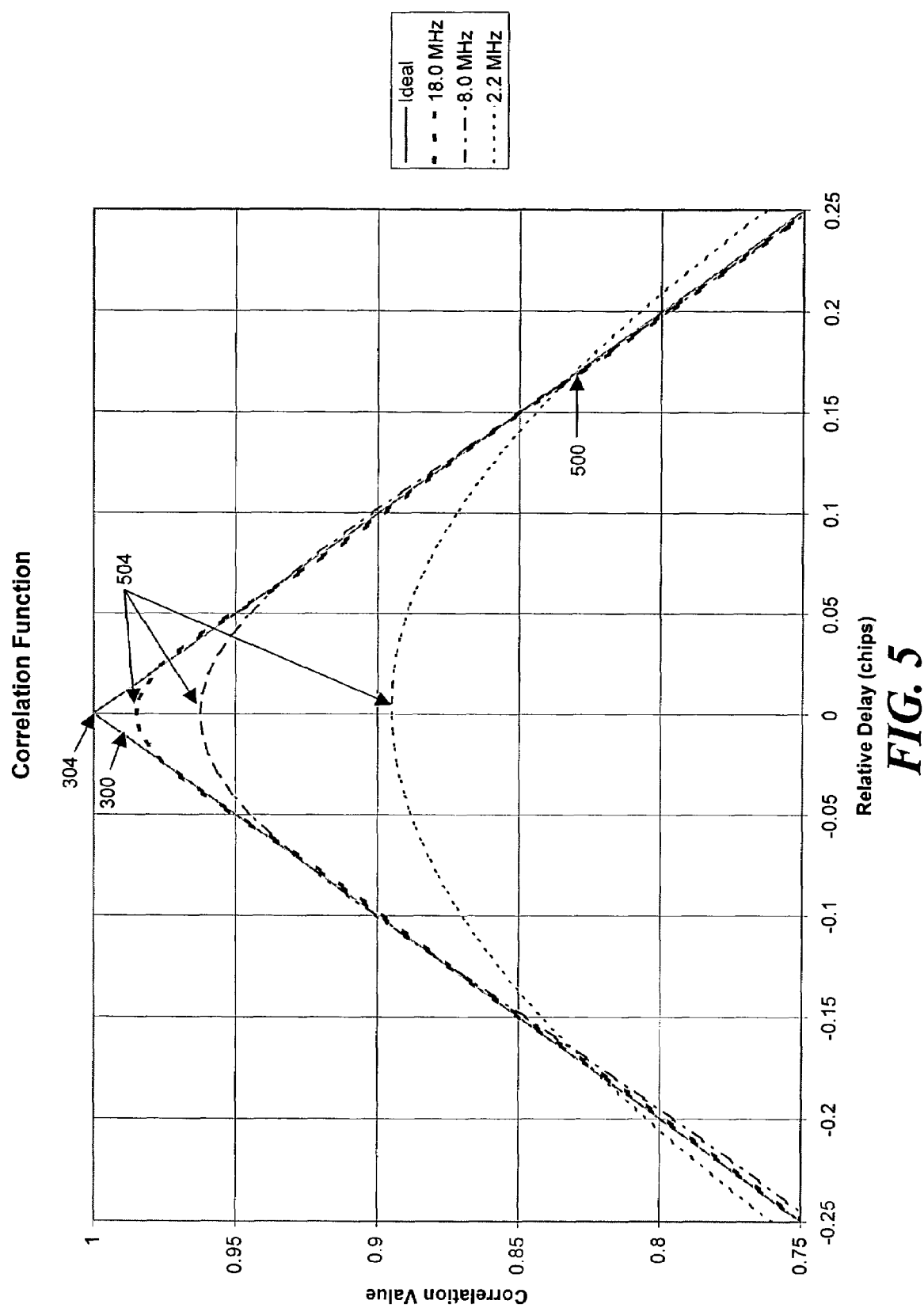
FIG. 5 is an illustration of a triangular pulse shape that includes affects attributable to satellite and receiver hardware.

Referring also to FIG. 5, correlation functions 500 are shown with rounded peaks 504 that are shaped by increasingly higher frequency receiver front ends as well as the effects that the satellite transmission hardware has on the signal. The satellite transmission hardware, for example, produces signals in which the code chip transitions have distinctive shapes, which result in differences in the associated correlation values. Accordingly, the distinctive shapes of the code chip transitions affect the of the correlation function, and thus, can affect the code tracking points. The contributions of the satellite transmission hardware are increasingly found to affect the pulse shapes for receivers that operate their front ends at higher frequencies. Thus, the hardware contributions are more noticeable to receivers operating at 18 MHz than, for example, at 8 MHz.

Different types of receivers, that is, different generations of the same receiver and/or receivers manufactured by different manufacturers, produce correspondingly different correlation functions 500. A receiver tracks a given code by measuring the correlation function 500 at two or more points that have fixed time offsets with respect to each other. The measured correlation values are mathematically combined to produce a discriminator function. Typically, the discriminator function will be a zero crossing function. The code tracking loop, or DLL 26, adjusts the relative offset of the correlators with respect to a code tracking point, so that the discriminator function output is zero. Tiny perturbations in the correlation function that are not symmetrical with respect to the correlation locations will cause the code tracking point, that is, the point at which the discriminator function reports a zero, to change. This small change is the code measurement bias.

The reference pulse shape models for a given type of receiver are created from correlation measurements that are produced by a stationary receiver that uses a dish or omni-directional antenna. The receiver, which is in a known position in which multipath sources are absent or at a minimum, collects amplitude, delay and relative phase data over a predetermined period of time, for example, several days, such that the contributions from noise and multipath signals average essentially to zero. The receiver collects more data for points close to the peak, that is, for the portions of the function that are of interest for code tracking. The receiver then produces the reference pulse shapes from the data using interpolation or other mathematical manipulation. The pulse shapes may be determined on a code family basis or, as appropriate, calibrated for the individual satellite codes.

Generally, the filtering that occurs with receivers operating with narrow bandwidth front ends tends to obscure the details in the correlation functions that are a result of satellite transmission differences, receiver implementation differences, manufacturing variability and multipath distortions. Therefore, wider bandwidth receivers are more able to exploit the fidelity of calibrated reference pulse shapes that incorporate satellite and receiver specific influences as opposed to the more generalized family based correlation shapes used on receivers with narrower bandwidth front ends. An individual receiver that utilizes the calibrated reference pulse shape models may thereafter manipulate the models to include therein the effects of the RF and IF paths through receiver. The receiver may thus determine data points or use modeling to further manipulate the calibrated reference models and produce individually calibrated reference pulse shapes that are unique to the receiver. This refinement of the calibrated reference pulse shape models occurs slowly over time and is performed whenever the receiver determines that a received signal is essentially free of multipath and/or excessive noise.

Figure 6:
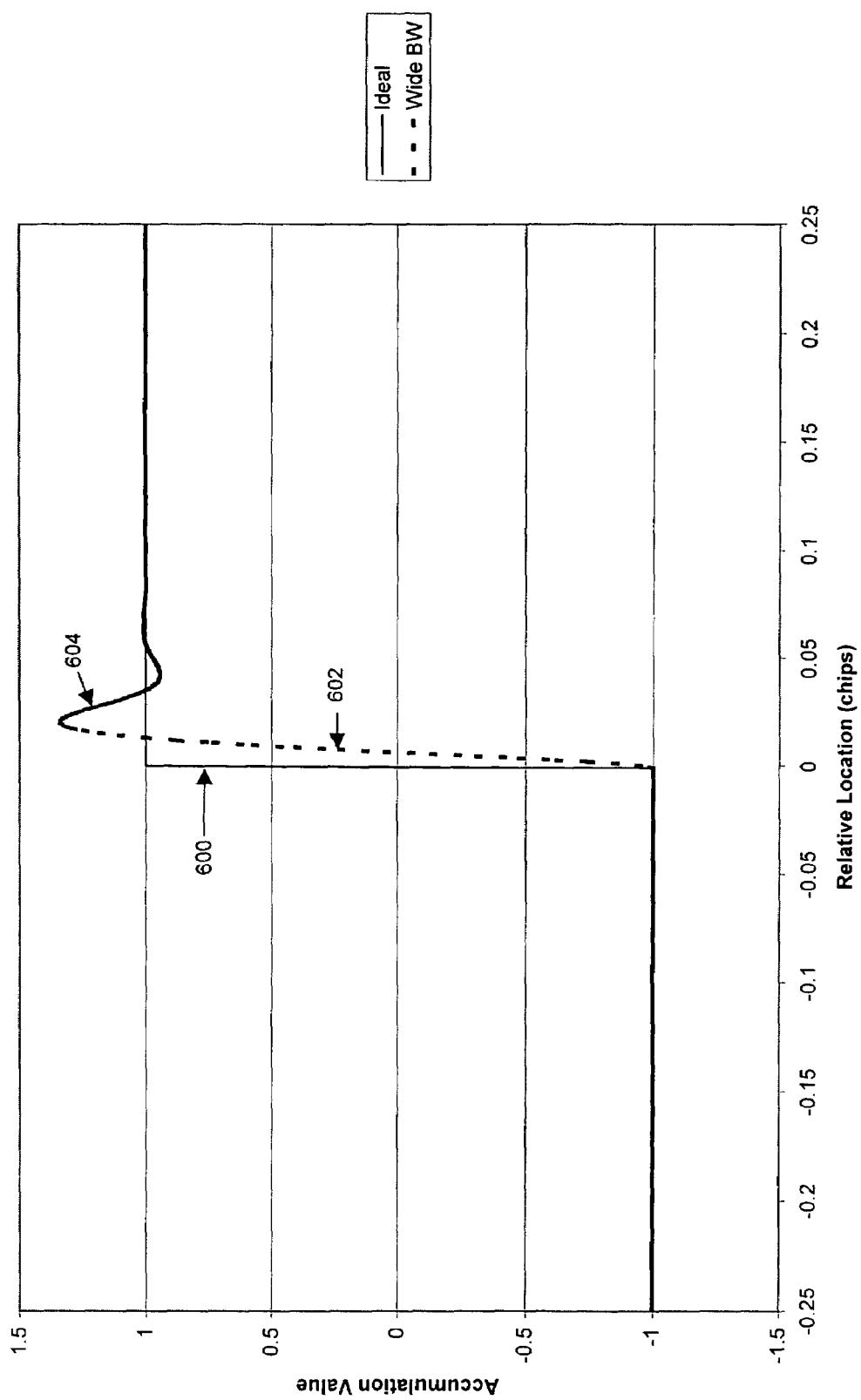
FIG. 6 is an illustration of an ideal step pulse shape and a step pulse shape that includes affects attributable to satellite and receiver hardware.

Referring now to FIG. 6 an ideal step shaped pulse 600 is shown, along with a non-ideal step shaped pulse 602 that includes ringing, generally 604, that is associated with the satellite and/or receiver RF and IF circuitry. The PRN code used affects the slope of the leading edge 606. The reference pulse shapes used in the receivers that utilize the pre-correlation filtering process are preferably calibrated per satellite, and may also be further calibrated by receiver, to include in the models the RF and IF ringing that is unique to the respective satellites and, as appropriate, the receivers.

A. Signal Quality Management

The reference pulse model shape table 20' includes correlation values that correspond to the reference pulse shape models for the various satellite codes or code families, as appropriate. The receiver uses the models, that is, the associated correlation values, to determine range biases or offsets, between channels that use different correlation techniques. Thus, the receiver calculates pseudoranges in the various channels using the model correlation values, and based on the results determines the offsets. The offsets are stored in a correlation correction table 22 are supplied to the position processing unit 18 before the respective pseudoranges are determined in the channels using real time correlation values. In this way, remaining differences in the pseudoranges calculated by the various techniques can be attributed to differences in the received signal, and thus, to the operation of the satellite transmitting the code.

The reference pulse shape models calibrated on a per satellite basis may also or instead be used to provide correlation values against which the real-time correlation values are assessed for signal quality management purposes. The assessment determines if the characteristics of the transmitted signal have markedly changed, and thus indicate if the satellite is malfunctioning. The respective models are retained by the receiver and used whenever the associated satellites are in view. The receiver thus need not undergo a calibration each time the receiver is powered-up or each time a satellite comes into view over the horizon to determine associated correlation values, as is required in the signal quality management operations performed by known prior receivers.

B. Differential Operating Mode

When operating in a differential mode, a reference receiver (not shown) periodically provides differential position correction data to the receiver 100', i.e., the remote receiver. The data, typically in the form of adjustments to the pseudoranges, essentially represents corrections to the satellite state and atmospheric delay information that is available to the remote receiver as, for example, almanac data. The reference receiver produces the differential position correction data based on the differences between the receiver's known position and the pseudoranges determined by the receiver using the signals received from the respective satellites then in view. The reference receiver provides the corrections to the remote receiver, and the remote receiver then uses the corrections in its calculations of estimated position and time, to account for changes in the satellite state or atmospheric conditions.

The differential position correction data provided by the reference receiver are thus based on the pseudorange calculations performed by the reference receiver. Accordingly, the data include range biases that correspond to the differences in the respective correlation function pulse shapes that are used by the reference receiver and the remote receiver. To correct for the biases, the receiver 100 or 100', that is, the remote receiver, maintains in the correlation correction table 20 or 20' correlation correction values for the respective code families and/or particular satellite codes, as appropriate. The correlation correction values correspond to differences between the reference pulse shape models that are maintained by the remote receiver and the reference pulse shapes that are maintained by or applicable to the reference receiver. The correlation correction values, which may be determined in one of several ways as discussed below, thus correspond to the associated range biases. The correlation correction values are applied to the differential position correction data, to adjust the data in order to remove the range biases, before the data are included in the pseudorange calculations.

When the position processing unit 18 is calculating a pseudorange using a given satellite code, the processing unit enters the correlation correction table 22 and retrieves the correlation correction value associated with the code. The processing unit then uses the correlation correction value to adjust the differential position correction data associated with the satellite code, and thus, remove or at least minimize the associated range bias. The processing unit then includes the adjusted differential position correction data in the calculations to produce the corresponding pseudorange value that is used to determine the remote receiver's estimated position and time.

Alternatively, the reference receiver may maintain the correlation correction table 20' and adjust the internally generated correction values before distributing them to the remote receiver. This implementation, which is based on selecting a set of reference pulse shapes that is to represent all of the remote receivers, may not provide the same degree of improvement to the position and time estimation performance of remote receivers that use other sets of reference pulse shape models.

The correlation correction values may be determined in various ways, depending on whether or not the reference receiver maintains reference pulse models and/or if the reference receiver is available to the remote receiver during calibration operations.

The correlation correction values may be determined through a calibration process that uses a common antenna for the remote and the reference receiver pair and collects a sufficient amount of data to reduce the tracking noise, multipath and other signal tracking anomalies to insignificant levels. The measurement data are processed by each receiver, to determine the differences in the corresponding calculated pseudoranges. The remote receiver then determines the adjustments required to the differential position data provided by the reference receiver, by essentially determining the differences in the code tracking points.

If the antenna to which the reference receiver is connected is not available for use by the remote receiver, the reference pulse shapes applicable to the operations of the reference receiver may be determined based on the correlation measurements made by the reference receiver. These reference pulse shape models may then be transmitted or otherwise provided to the remote receiver, and the remote receiver may determine the differences between its models and those of the reference receiver. Thus, the remote receiver attempts to overlay its own reference pulse shapes on those of the reference receiver and, using a best fit analysis, determine the differences in the tracking points of the two receivers for the various satellite codes and/or code families.

Alternatively, the correlation correction values may be determined at the manufacturer, based on derived reference pulse shape models for the remote and the reference receivers.

C. Multipath Mitigation

Referring now FIG. 7, the MMT processor 50 provides phase and code correction information. These corrections may be applied internally or externally of the receiver 100. Some applications require carrier phase and code phase measurements produced using specific standard tracking techniques but also utilize the improved multipath mitigation capabilities available with correction information provided by the MMT processor 50. Exporting the MMT corrections with the measurements obtained using the standard techniques provides a means for such users to selectively apply the corrections in a manner that meets their requirements. The MMT corrections must be applied internally before the positioning processing unit 18 if there is to be an improvement in the position and time estimation accuracy reported by the receiver 100.

The computational requirements for MMT processing typically preclude the direct use of phase corrections in the PLL 28 and/or the carrier tracking loop 36. Instead the phase corrections are applied to the carrier phase measurements generated by the phase generator 40 by an adder 32. This correction is updated at a rate that is much lower than the PLL 28 update rate. Two underlying assumptions are used to justify this design. The first assumption is that the effects of the multipath are relatively constant over the update period of the MMT processor 50. The second assumption is that integration over the MMT update period will effectively mitigate effects of a rapidly changing multipath and no corrections are needed. As mentioned earlier, the adder 32 function may be implemented outside the physical receiver 100.

Typical update rates of the DLL 26 are low enough that it allows synchronous operation of MMT processor 50. Therefore, a receiver can be configured such that the MMT code corrections are applied to the code tracking loop 34 by being incorporated into the DLL 26 through switch 51, by selecting the 51*a* configuration. Alternatively, the MMT code corrections can be applied to the code phase measurements using the adder 52, by configuring switch 51 into the 51*b* configuration. The adder 52 function may be implemented outside the physical receiver 100.

The MMT processor 50 includes the table 20 or 20' that contains calibrated reference pulse shapes for the respective satellite PRN codes. During a correlation operation, the MMT processing enters the table, using information that uniquely identifies the associated satellite code, and retrieves therefrom the appropriate calibrated reference pulse shape. The MMT processing unit then includes the calibrated reference pulse shape in the MMT processing operations that produce, in a known manner, an estimate of at least the direct path signal. The MMT processor 50 also produces associated multipath mitigation correction signals and provides the signals to the code tracking loop 34, the carrier phase measurements, or to the adder 52, as appropriate.

The calibrated reference pulse shapes provide the MMT processor 50 with more precise models of the correlation functions associated with the direct path signals. The MMT processor can thus more readily distinguish the direct path signals from the multipath signals. In particular, the MMT processor can more readily distinguish the direct path signals from multipath signals that have chip transition times that are relatively close to the chip transition times in the direct path signal. As discussed above, the model uses interpolation or other mathematical manipulation techniques to determine correlation values along at least the portion of the model pulse shape that is important for precise code tracking, i.e., near the correlation function peak.

The foregoing description has been limited to a specific embodiment of this invention. It will be apparent, however, that variations and modifications may be made to the invention, with the attainment of some or all of its advantages. For example, the reference pulse shapes may be in the form of one or more spline functions, or other mathematical functions. Therefore, it is the object of the appended claims to cover all such variations and modifications as come within the true spirit and scope of the invention, including substituting a memory or other storage device for the lookup table.

What is claimed is:

1. A GNSS receiver including
   A. means for establishing the relative timing between a received signal and a locally generated signal,
   B. a set of reference pulse shape models, and
   C. a processor that calculates position and time estimates, the processor using the reference pulse shape models to correct for associated range biases.

2. The GNSS receiver of claim 1 wherein the processor includes in the calculations differential position correction data supplied by a reference receiver at a known location and range bias corrections to the data that are based on differences between the reference pulse models applicable to the GNSS receiver and to the reference receiver.

3. The GNSS receiver of claim 1 wherein the processor uses the reference pulse shape models to determine range biases between receiver channels that use different correlation techniques, and
   determines satellite malfunction if different channels determine different pseudoranges to the same satellite after correction for the determined range biases.

4. The GNSS receiver of claim 1 wherein the reference pulse shapes correspond to code families.

5. The GNSS receiver of claim 1 wherein the reference pulse shapes are calibrated per satellite code.

6. The GNSS receiver of claim 5 wherein the reference pulse shape models are further calibrated based on the operations of the receiver.

7. The GNSS receiver of claim 5 further including
   A. tracking loops that track signals received from respective GNSS satellites; and
   B. a multipath mitigation processing unit that produces an estimate of a direct path signal based on data produced by the tracking loops and the calibrated reference pulse shapes that correspond to the signals transmitted by the respective satellites, the multipath mitigation processor providing correction information that may be used within the code tracking loops or applied to the generated code and carrier generator states to correct for the effects of multipath signals.

8. The receiver of claim 7 wherein the tracking loops are carrier phase and code tracking loops.

9. The receiver of claim 8 wherein the calibrated pulse shapes are contained in a lookup table, and the table is addressed using information that identifies both the respective signal type and satellite.

10. The receiver of claim 8 wherein the multipath mitigation processing unit includes a memory that contains the calibrated pulse shapes.

11. The receiver of claim 1 wherein the means for establishing the relative timing include correlators.

12. The receiver of claim 1 wherein the means for establishing the relative timing include a pre-correlation filter.

13. A method of tracking GNSS signals, the method including the steps of:
    A. acquiring a GNSS signal;
    B. determining carrier phase and code tracking errors between locally generated carrier and code signals and received carrier and code signals;
    C. adjusting the carrier phase and code tracking errors to compensate for effects of multipath signals based on estimates of direct path signals that are calculated using reference pulse shapes that are calibrated on a specific signal per satellite basis;
    D. controlling carrier phase and code generators using the adjusted phase and code tracking errors to more closely align the locally generated carrier and code signals with the received carrier and code signals; and
    E. repeating steps B-D.

14. The method of claim 13 wherein the step of determining carrier phase and code tracking errors includes operating a carrier phase tracking loop and a code tracking loop.

15. The method of claim 13 wherein the step of adjusting includes entering memory to retrieve the calibrated pulse shapes that correspond to the respective codes being tracked.

16. The method of claim 13 wherein the step of adjusting further includes using reference pulse shapes that have been further calibrated for the receiver that acquired the GNSS signal.

17. A method of determining pseudoranges and carrier phase ranges, the method including the steps of:
    A. acquiring a GNSS signal;
    B. determining carrier phase and code tracking errors between locally generated carrier and code signals and received carrier and code signals;
    C. adjusting the carrier and code phases to minimize the tracking errors and controlling carrier phase and code generators to more closely align the locally generated carrier and code signals with the received carrier and code signals;

D. adjusting the code phase and carrier phase measurements to compensate for effects of multipath signals based on estimates of direct path signals that are calculated using reference pulse shapes that are calibrated on a specific signal per satellite basis; and E. determining pseudoranges and carrier phase measurements using the adjusted code and carrier phase measurements.

18. A GNSS receiver including

A. means for establishing the relative timing between signals to be tracked and a locally generated signal, B. a set of reference pulse shape models that are correlation values associated with codes in the received signal and are applicable to the receiver, and C. a processor that calculates position and time estimates, the processor using the reference pulse shape models to correct for associated range biases.

19. The GNSS receiver of claim 18 wherein the set of reference pulse shape models are further associated with a receiver type.

20. The GNSS receiver of claim 19 wherein the set of reference pulse shape models are further associated with families of codes.

21. The GNSS receiver of claim 19 wherein the set of reference pulse shape models are further associated with individual codes.

22. The GNSS receiver of claim 18 wherein the set of reference pulse shape models are calibrated by receiver.

23. The GNSS receiver of claim 18 wherein the set of reference pulse shape models are further calibrated by satellite.

* * * * *